(12) United States Patent
Reynolds et al.

(10) Patent No.: US 7,447,748 B2
(45) Date of Patent: Nov. 4, 2008

(54) INTERACTIVE WEB BOOK SYSTEM

(75) Inventors: Brian Reynolds, Hopewell (JM); Richard S Goldhor, Belmont, MA (US)

(73) Assignee: Fasm Network Services, LLC, Wilmington, DE (US)

( * ) Notice: Subject to any disclaimer, the term of this patent is extended or adjusted under 35 U.S.C. 154(b) by 261 days.

(21) Appl. No.: 10/783,711

(22) Filed: Feb. 20, 2004

(65) Prior Publication Data

US 2005/0050166 A1    Mar. 3, 2005

Related U.S. Application Data

(60) Continuation of application No. 10/145,979, filed on May 13, 2002, now Pat. No. 6,721,788, and a division of application No. 09/329,142, filed on Jun. 9, 1999, now Pat. No. 6,411,993, which is a continuation of application No. 08/735,727, filed on Oct. 23, 1996, now Pat. No. 6,052,717.

(51) Int. Cl.
G06F 13/14    (2006.01)
G06F 15/16    (2006.01)

(52) U.S. Cl. ............... 709/218; 709/203; 709/219
(58) Field of Classification Search ........ 709/218, 709/203, 219; 707/10
See application file for complete search history.

(56) References Cited

U.S. PATENT DOCUMENTS

| | | | |
|---|---|---|---|
| 4,768,087 A | 8/1988 | Taub et al. | 358/84 |
| 5,050,213 A | 9/1991 | Shear | 380/25 |
| 5,193,185 A | 3/1993 | Lanter | 707/101 |
| 5,359,508 A | 10/1994 | Rossides | 364/401 |
| 5,410,598 A | 4/1995 | Shear | 380/4 |
| 5,532,920 A * | 7/1996 | Hartrick et al. | 715/500 |
| 5,546,517 A | 8/1996 | Marks et al. | 707/501 |
| 5,561,803 A | 10/1996 | Kilis | 395/707 |
| 5,629,980 A | 5/1997 | Stefik et al. | 380/4 |

(Continued)

FOREIGN PATENT DOCUMENTS

FR    2657451    7/1991

(Continued)

OTHER PUBLICATIONS

"Interactive Books," by G. M. Manzini et al, International Journal of Modern Physics C, vol. 5, pp. 785-789 (1991).*

(Continued)

*Primary Examiner*—Krisna Lim
(74) *Attorney, Agent, or Firm*—Darby & Darby PC

(57) ABSTRACT

An interactive Web book ("ibook") system is provided that allows material to be contributed to the World Wide Web. An ibook is a self-extending, self-sustaining information-redistributing Web robot, which is resident on a data network such as the Internet or an intranet. Users may enroll with an ibook as viewers or contributors. Viewers may view ibook material, such as text or multimedia content. Contributors may contribute original material to the ibook or may create derivations of existing ibook material. Attribution information that identifies the source of material in a derivation is automatically generated. Information concerning the derivation of each work and its characteristics can be used to help the user navigate through ibook material. The ibook system keeps track of how often users access each work within an ibook. Contributors may be automatically rewarded (e.g., by a monetary distribution) based on the extent to which their contributed material is viewed by the users.

38 Claims, 14 Drawing Sheets

U.S. PATENT DOCUMENTS

| | | | |
|---|---|---|---|
| 5,634,012 A | 5/1997 | Stefik et al. | 395/239 |
| 5,638,443 A | 6/1997 | Stefik et al. | 380/4 |
| 5,708,825 A | 1/1998 | Sotomayor | 707/501 |
| 5,715,403 A | 2/1998 | Stefik | 395/244 |
| 5,724,521 A | 3/1998 | Dedrick | 395/226 |
| 5,737,734 A | 4/1998 | Schultz | 707/5 |
| 5,749,736 A | 5/1998 | Griswold et al. | 434/322 |
| 5,892,900 A | 4/1999 | Ginter et al. | 713/200 |
| 6,092,080 A | 7/2000 | Gustman | 707/103 R |
| 6,289,460 B1 | 9/2001 | Hajmiragha | 713/200 |
| 6,961,897 B1* | 11/2005 | Peel et al. | 715/209 |
| 6,990,464 B1* | 1/2006 | Pirillo | 705/26 |
| 7,039,589 B2* | 5/2006 | Whitham | 704/270 |

OTHER PUBLICATIONS

"CrystalWeb—A Distributing Authoring Environment For the World Wide Web," by Ralph Peters et al., Computer Networks and ISDN Systems vol. 27, pp. 861-870 (1995).*

"Unifying Tomorrow's Hypermedia" T.H. Nelson, Online Information 88, 12th International Online Information Meeting London Dec. 6-8, 1988, Proceedings vol. 1, pp. 1-7.

"Literary Machines 93.1" Theodor Holm Nelson, Mindful Press, 1992, 286 pages.

"Xanadu: document interconnection enabling re-use with automatic author credit and royalty accounting" Theodor Holm Nelson, Information Services & Use, vol. 14, No. 4, 1994, pp. 255-265.

"The Heart of Connection: Hypermedia Unified by Transclusion" Theodor Holm Nelson, Communications of the ACM, vol. 38, No. 8, Aug. 1995, pp. 31-33.

"Transcopyright: Pre-Permission for Virtual Republishing" Theodor Holm Nelson, Computer Technology Review, vol. 15, No. 10, Oct. 1995, p. 10.

"CrystalWeb—A Distributed Authoring Environment For the World-Wide Web," by Ralph Peters et al., Computer Networks and ISDN Systems vol. 27, pp. 861-870 (1995).

"Interactive Books," by G.M. Manzini et al., International Journal of Modern Physics C, vol. 5, No. 5, pp. 785-789 (1991).

Brown, "Special Edition: Using Netscape 2 Second Edition," Que Corporation, 1995.

* cited by examiner

INTERACTIVE WEB BOOK SYSTEM

This is a continuation of application Ser. No. 10/145,979, filed May 13, 2002, now U.S. Pat. No. 6,721,788, which is a continuation of application Ser. No. 09/329,142, filed Jun. 9, 1999, now U.S. Pat. No. 6,411,993, which is a continuation of application Ser. No. 08/735,727, filed Oct. 23, 1996, now U.S. Pat. No. 6,052,717.

BACKGROUND OF THE INVENTION

This invention relates to the Internet, and more particularly, to techniques for creating and viewing material on the World Wide Web in the form of an interactive Web book.

The World Wide Web has made the Internet accessible to a broad range of people. One can search the Web and view a large amount of material using a Web browser. However, there is no satisfactory framework within the Web to encourage contributions of new material while rewarding contributors for their efforts. As a result, many people who might make meaningful contributions of entertaining or educational material to the World Wide Web do not make such contributions.

It is therefore an object of the present invention to provide a way in which to facilitate the contribution of material using a data network such as the World Wide Web and to compensate the contributors of such material.

SUMMARY OF THE INVENTION

This and other objects of the invention are accomplished in accordance with the principles of the present invention by providing an interactive Web book ("ibook") system. An ibook is a self-extending, self-sustaining information-redistributing Web robot, which is resident on a data network such as the Internet or an intranet. Material in an ibook is preferably organized in the form of Web pages. Material may be in text, two-dimensional, three-dimensional or n-dimensional graphics, animation, audio, video, source or executable code, or any type of multimedia format. Within each Web page, material may be organized in passages. Passages can be of any suitable size, such as a paragraph for textual material, or a video or audio clip of a certain length for multimedia material.

Users can preferably enroll as viewers of the ibook or as contributors to the ibook. Viewers are allowed to view (i.e., read, hear, observe, observe the behavior of, etc.) material in the ibook. Presentation of ibook material for viewing may involve the execution of computer code associated with or contained in that material. Contributors can view material and can contribute material. The contributed material can be original or can be based on the work of other contributors.

Works that are created based on previously contributed material are called derivations. When a contributor uses certain authoring functions in the ibook system, such as by performing a cut and paste operation from existing material or by using a compiler of the contributor's to compile existing source code, attribution links are automatically formed between the material in the derivation and the original material. This attribution information is preferably used by the ibook system in rewarding contributors. Contributors are rewarded based on the amount that their material is accessed by viewers. The more often a contributor's material is used (either directly or indirectly), the more that contributor will be rewarded. Preferably, the reward may be made in the form of an automatic monetary distribution by the ibook system.

As ibook material is created, derivation information is compiled that can be used by the ibook navigation system when a user desires to view material in an ibook. For example, when viewing a passage for which a derivation exists, the viewer can be presented with the option of viewing the derivation. The viewer is also presented with options for navigating through the material in an ibook based on a selected author, subject matter, media type, etc.

The ibook system may automatically advertize its presence to various search engines by transmitting suitable keyword information (e.g., keyword information identifying the subject matter of the contents of the ibook) to databases associated with the search engines.

If desired, new ibooks may be spawned by replicating the content and structure of an existing ibook. Replicating may be achieved by copying material or by creating references from the new ibook to the existing ibook.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
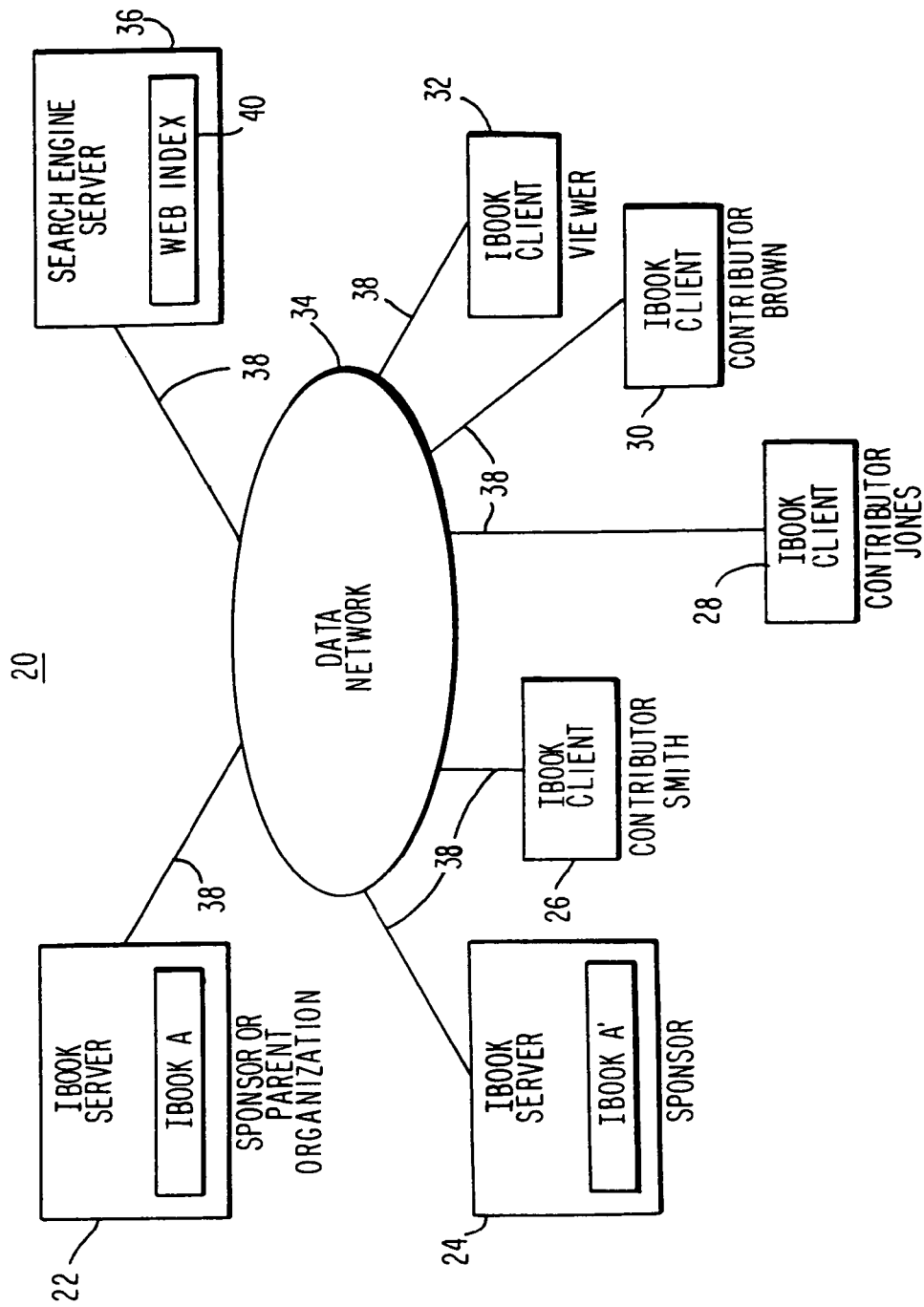
FIG. 1 is a system diagram showing interactive Web book servers and interactive Web book clients interconnected by a data network.

An interactive Web book ("ibook") system 20 is shown in FIG. 1. Web server computers that support one or more ibooks are called ibook servers. Ibook servers 22 and 24 are interconnected with ibook client computers 26, 28, 30, and 32 via data network 34. Also connected to data network 34 is search engine server 36. Data network 34 is preferably a packet-based data network such as the Internet or an intranet (i.e., a local area network (LAN) or wide area network (WAN) using Internet protocols). Communication paths 38 are modem lines or LAN or WAN network connections.

Contributors at ibook clients 26, 28, and 30 can contribute material to an ibook, such as ibook A' on server 24. The contributed material can be in any media type supported by the Internet, such as text, audio, and video information. Some contributed material may be literary or artistic in nature, such as an essay, song, painting, or movie. Other contributed material may be of a more technical or utilitarian nature, such as the source code for computer program modules (e.g., modules of code implementing ibook functions, such as demons or plug-ins) or descriptions of inventive ideas. An ibook may contain a number of different types of contributions, such as essays, songs, and video clips, structured around a central theme. If desired, ibooks may be set up to support more limited types of media and more focused formats. For example, an ibook might be devoted to a mystery novel, might contain only contemporary music, or might be devoted to a programming environment for a particular computer programming language.

Ibooks may initially be supported by a sponsor who sets up an ibook on an ibook server and who may, for example, advertise that ibook's presence and chosen theme by arranging to have suitable information regarding the ibook included in Web index 40. One way in which to set up an ibook is to replicate the structure and possibly the contents of an existing ibook. For example, a sponsor at ibook server 24 might replicate ibook A from the ibook server 22 of a parent organization thereby creating ibook A' at ibook server 24.

People who wish to contribute content to an ibook must typically enroll with that ibook prior to making any contributions. Each ibook therefore has an associated community of contributors. Although contributors to an ibook may often make contributions that are completely their own, contributors may also make contributions that are based upon the previously contributed material of another contributor or contributors. The ultimate contents of a given ibook is therefore usually a collaborative effort between many contributors.

A viewer at ibook client 32 can preferably view the material contributed to an ibook without enrolling as a contributor. "Viewing" (by a contributor or by a viewer) includes reading, listening, and observing any type of contributed material that is contained in an ibook and its behavior. Presentation of ibook material for viewing may involve the execution of computer code associated with or contained in that material.

Figure 2:
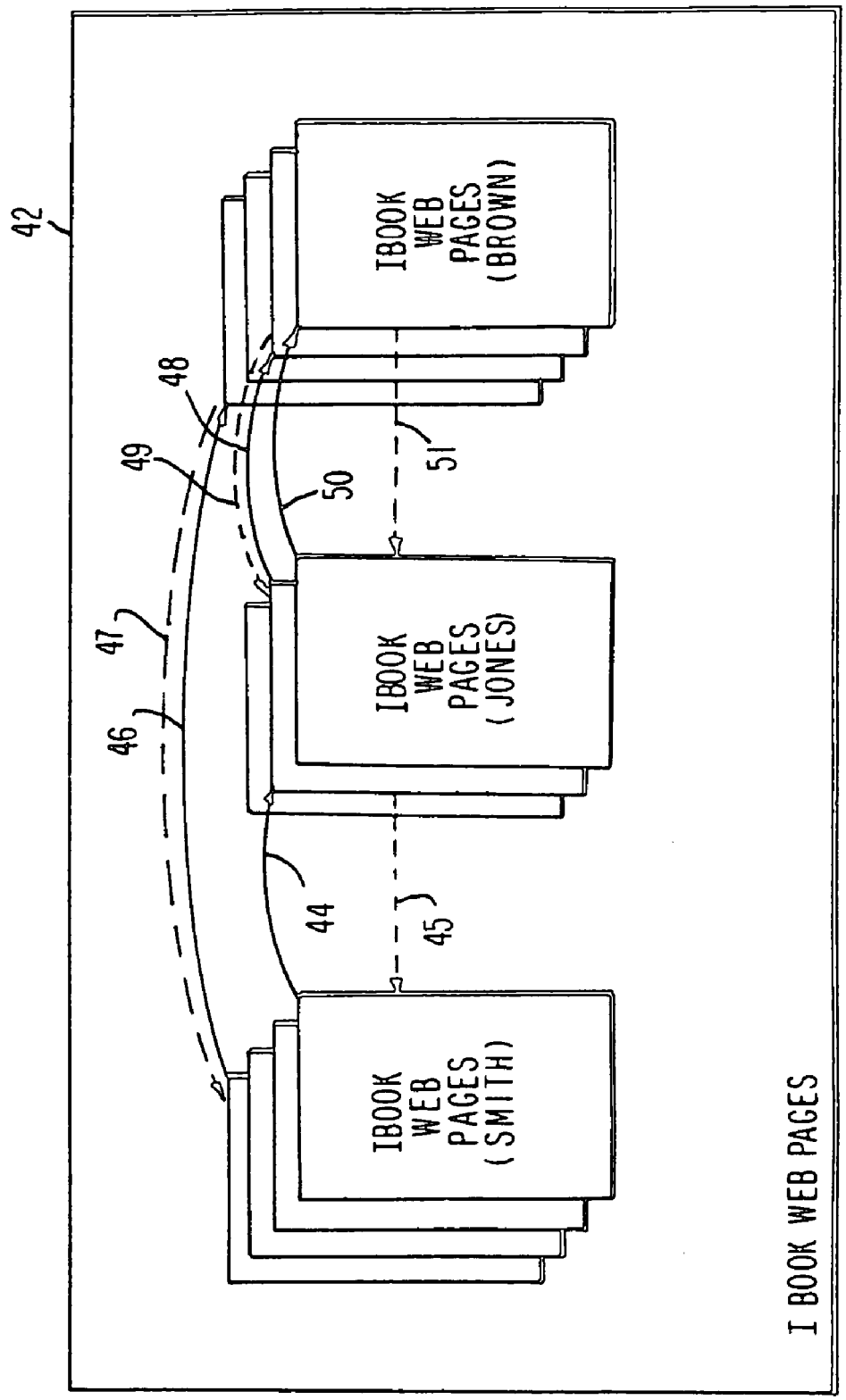
FIG. 2 is a diagram showing the content of an illustrative interactive Web book.

Contributed material is preferably stored in the form of ibook web pages 42, as shown in FIG. 2. An important aspect of any ibook is that it allows derivations of contributed material to be created by adding additional Web pages. The ibook system supports derivations that are alternate versions of existing works. For example, if contributor Smith writes several chapters of a book, contributor Jones may modify a chapter to create his own alternate version of that chapter. An association between the original and alternate versions of this material is preferably automatically made by the ibook system. The association is indicated by forming derivation link 44 and attribution link 45.

If contributor Brown creates alternate versions of the material of contributors Smith and Jones, derivation links 46, 48, and 50 and attribution links 47, 49, and 51 are formed. Derivation and attribution links are used by the system when navigating through ibook Web pages 42. For example, when a viewer wishes to view a given portion of an ibook, derivation links 46, 48, and 50 may be used to present the viewer with the option of viewing the alternate versions of the material as well as the original version. Likewise, attribution links 47, 49, and 51 may be used to present the viewer with the option of viewing the original version of an alternate version.

In addition to creating derivations that are alternate versions of existing material, contributors can create derivations which are usually viewed in parallel to existing material. For example, a contributor may wish to create a running commentary on a multimedia segment or a song. Although the commentary is not an alternate version of the existing material, it is related in such a way that it is appropriate to recognize the original contributor. Another example is multiple audio tracks, which may be listened to and mixed in varying proportions in parallel. The ibook system facilitates the automatic or nearly automatic generation of derivation and attribution links between the original material and the derivations. The ibook system uses the attribution link information for navigating and to ensure that contributors are rewarded for their efforts. The ibook system uses the derivation link information to facilitate navigation through ibook material and thereby encourage contributions by ensuring that a contributor's material may be viewed.

A derivation may contain a quotation of existing material when a contributor creates material that is in part the same as that previously contributed by another contributor.

A derivation may be a revision of a work if it contains all of the previous work except errors and material that the contributor believes is inappropriate. The revision may have additional material that the contributor believes should have been in the original work. For example, the original material might be a rough draft of a speech, whereas the revision might be the final draft of the speech.

A derivation may be a combination containing material derived from two separate sources. For example, a derivation might be a story containing portions of stories from two different authors or a sequence of musical fragments from different composers or a mix of multiple tracks into a single song.

A derivation may be a sequel in which the subject, characters, and context of a previous work are extended into a new area. A sequel is typically intended to be viewed after the original, rather than in place of the original.

A derivation may be a transcription that contains material in a different media or language than the original material. For example, the original might contain English text and the transcription might contain the same material in French. Alternatively, the original material might contain the score of a song and the transcription might contain a recording of a performer singing the song. If the original contains a Java script for an applet, the transcription might contain an Active object that performs the same function as the Java script. If the original contains computer source code, the transcription may contain a translated or compiled version of the code.

A derivation may be an invocation which may be encountered, e.g., in the programming context. An invocation employs the contents and capabilities of an original work for the benefit of the invocation. If the original material changes, these changes are presented the next time that the invocation is viewed. Invocations therefore allow for a dynamic reference to previously contributed material.

A derivation may contain the same material as an existing work, but with a different quality or resolution. For example, it may be desired to store a high fidelity audio track at one location and a lower fidelity version of the same track at a different location.

A collaborative derivation may be created by a contributor who is viewing the work of another contributor without explicitly incorporating the work of the other contributor. For example, a composer may create a track of a song while listening to an existing track of another composer.

Figure 3:
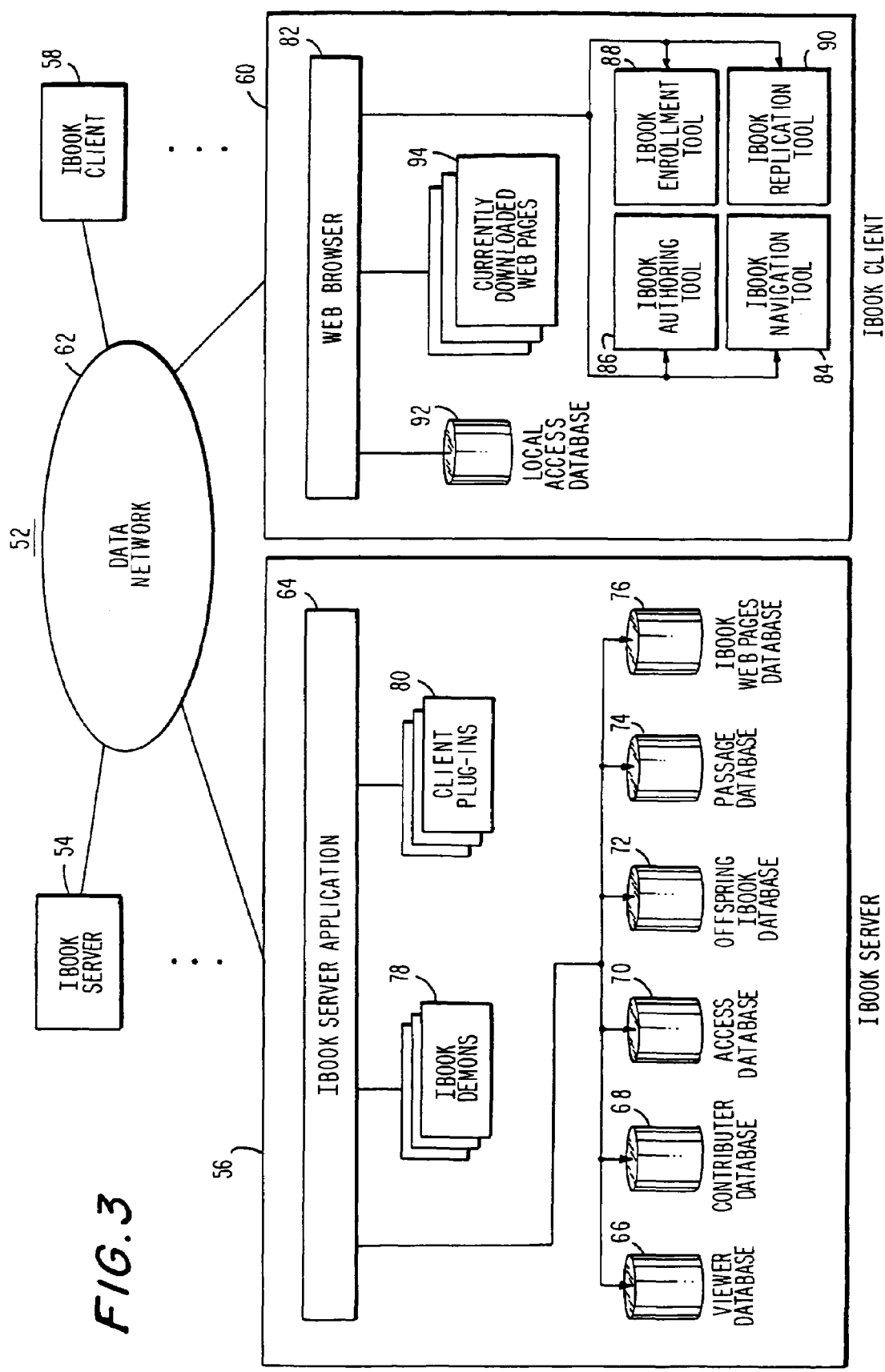
FIG. 3 is a detailed diagram of an interactive Web book server and an interactive Web book client interconnected by a data network.

FIG. 3 is a more detailed view of the system of FIG. 1. In ibook system 52, ibook servers 54 and 56 are interconnected with ibook clients 58 and 60 via data network 62. Ibook servers 54 and 56 are preferably computers or clusters of computers sufficiently powerful to handle Web traffic from numerous clients. If desired, the functions of servers 54 and 56 may be divided among several servers, which may be geographically remote from each other. For example, the database functions of server 54 could be provided by a database server connected to server 54 directly or through data network 62. Ibook clients 58 and 60 may be personal computers. At times, clients 58 may store ibook material and may perform server-like functions. Data network 62 is preferably a packet-based data network such as the Internet or an intranet.

Ibook functions are preferably performed by executing instructions with ibook server 56 and with client 60. Ibook server application 64 directs the overall operation of ibook server 56. In particular, ibook server application 64 controls databases 66, 68, 70, 72, 74, and 76, in which various ibook information is stored. Ibook demons 78 are programs associated with ibook server application 64, but which run continuously or semicontinuously in the background. Ibook demons 78 perform functions such as revenue collection, revenue distribution, and advertising.

Client plug-ins 80 are downloadable executable program modules that can be run on client 60 in conjunction with Web browser 82 to add additional capabilities to Web browser 82. Web browser 82 is preferably a standard Web browser, such as Microsoft Internet Explorer or Netscape Navigator. Downloading of client plug-ins 80 can be accomplished using standard techniques, such as the standard Internet file transfer protocol (FTP). When client plug-ins 80 are downloaded onto client 60, they form tools 84, 86, 88, and 90. Web browser 82 also controls local access database 92, which may be used to store information regarding the amount of time a user (i.e., a viewer or a viewing contributor) spends viewing a particular portion of an ibook. Currently downloaded Web pages 94 are downloaded from ibook Web pages database 76.

Users of a given ibook are preferably either enrolled as viewers or contributors. Viewers can view any of the material in an ibook with which they have enrolled, but cannot make contributions to the ibook. Contributors can contribute new material or can create a derivation based on previously contributed material in an ibook. Because contributors must be able to view material before it can used to create a derivation, contributors are also given rights to view ibook material.

By enrolling, both viewers and contributors agree not to violate the rights of other contributors (e.g., by copying material from an ibook without permission). Contributors must also agree to allow their works to become the basis for the works of other contributors, so that participating in an ibook is a collaborative effort.

Enrollment is preferably automated and on-line. At ibook client 60, the functions necessary to support enrollment are provided by ibook enrollment tool 88 and web browser 82. At ibook server 56, enrollment functions are provided by ibook server application 64. Ibook server application 64 downloads enrollment tool 88 to ibook client 60, and stores enrollment information in the ibook server databases. Ibook server application stores viewer enrollment information in viewer database 66 and contributor enrollment information in contributor database 68.

Figure 4:
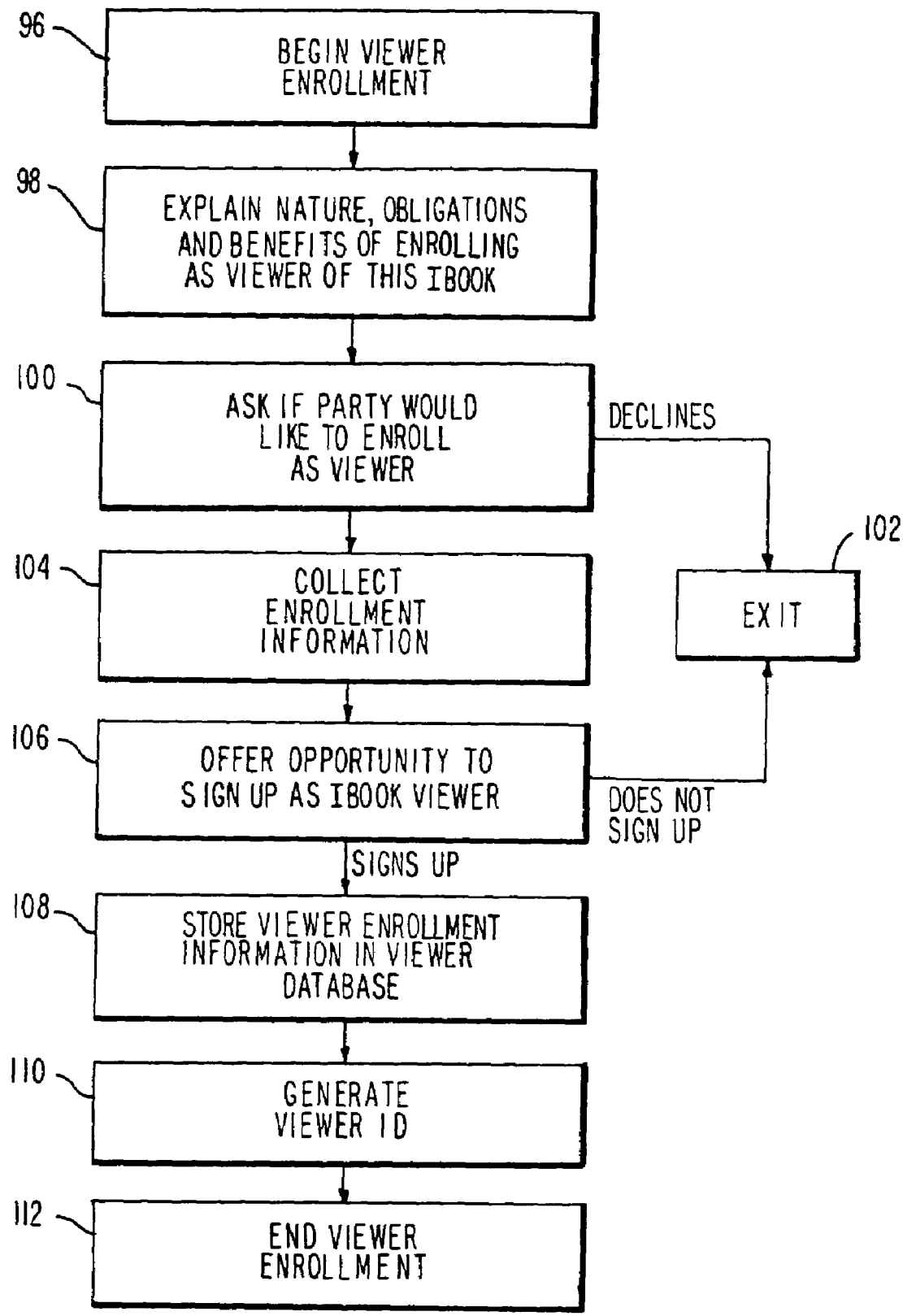
FIG. 4 is a flow chart of the process of enrolling a viewer.

A suitable process for enrolling viewers is shown in FIG. 4. At step 96, an interested party begins the process of enrolling as a viewer, e.g., by clicking on an icon labeled "enroll as viewer." The nature, obligations, and benefits of enrolling as a viewer of the ibook are explained to the interested party at step 98. At step 100, the party is asked whether enrollment is desired. If the party declines enrollment at step 100, viewer enrollment terminates at step 102. If the party accepts enrollment, enrollment information, such as the party's address, electronic billing information, credit card number, etc., is collected at step 104.

Provided that the enrollment information collected at step 104 does not reveal a reason that the party cannot be enrolled, the party is offered an opportunity to sign up as an ibook viewer at step 106. If the party does not sign up at step 106, viewer enrollment terminates at step 102. If the party decides to sign up, signing up can be accomplished by a number of techniques, including clicking on an icon, typing the words "I ACCEPT", transmitting an electronic signature, live teleconference with an ibook representative, voice-mail, fax, mail, or a combination of these techniques. After signing up at step 106, information concerning the viewer and the viewer enrollment process is stored in viewer database 66 at step 108.

At step 110, ibook server application 64 generates a viewer ID for the viewer. The viewer ID is used to access the ibook with which the viewer has enrolled. If desired, the viewer ID can be used in conjunction with additional security measures, such as a password, etc. The viewer enrollment process ends at step 112.

Figure 5:
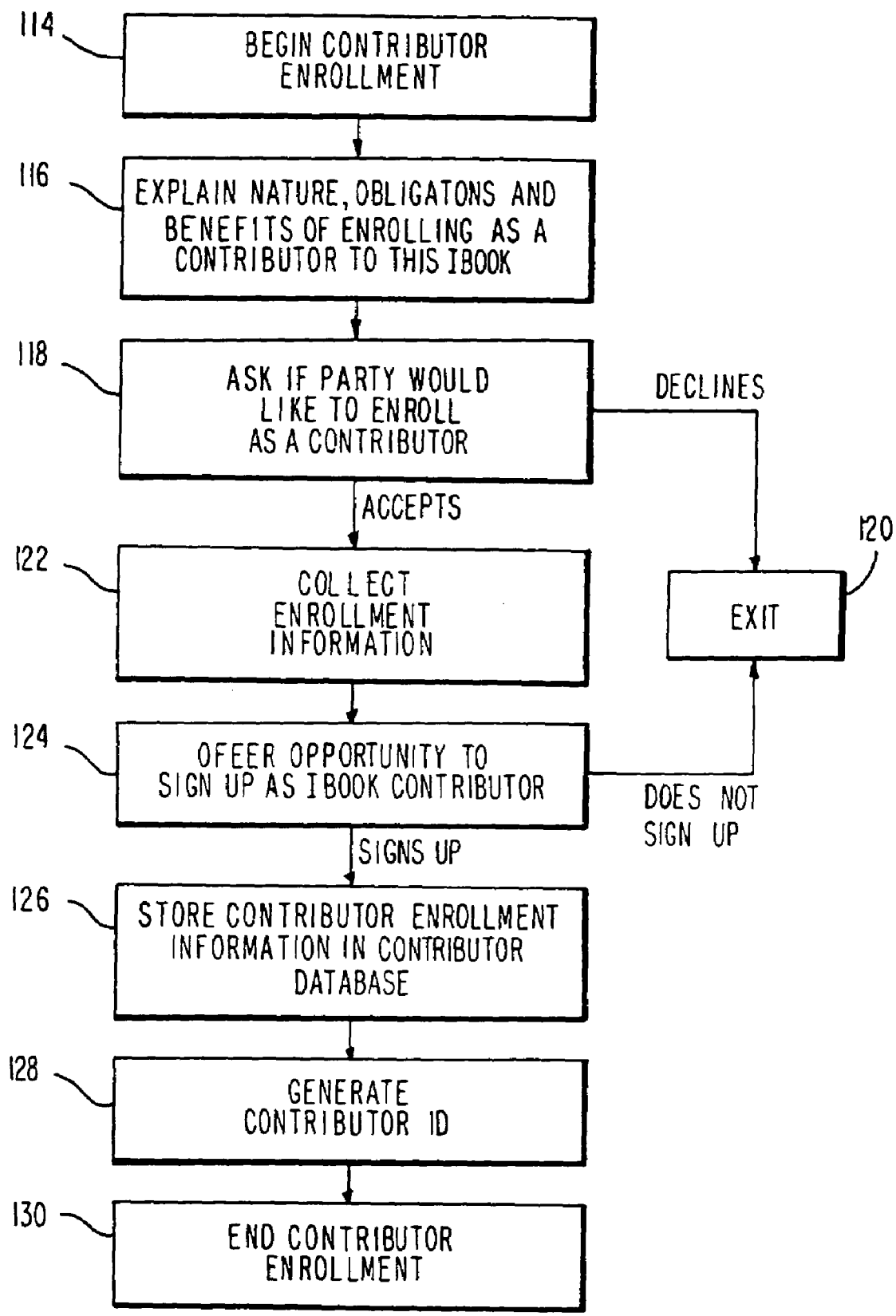
FIG. 5 is a flow chart of the process of enrolling a contributor.

A suitable process for enrolling contributors is shown in FIG. 5. At step 114, an interested party begins the process of enrolling as a contributor, e.g., by clicking on an icon labeled "enroll as contributor." The nature, obligations, and benefits of enrolling as a contributor of the ibook are explained to the interested party at step 116. At step 118, the party is asked whether enrollment is desired. If the party declines enrollment at step 118, contributor enrollment terminates at step 120. If the party accepts enrollment, enrollment information, such as the party's address and electronic banking information, is collected at step 122.

Provided that the enrollment information collected at step 122 does not reveal a reason that the party cannot be enrolled, the party is offered an opportunity to sign up as an ibook contributor at step 124. If the party does not sign up at step 124, contributor enrollment terminates at step 120. If the party decides to sign up, signing up can be accomplished by a number of suitable techniques, including clicking on an icon, typing the words "I ACCEPT", transmitting an electronic signature, live teleconference with an ibook representative, voice-mail, fax, mail, or a combination of these techniques. After signing up at step 124, information concerning the contributor and the contributor enrollment process is stored in contributor database 68 (FIG. 3) at step 126. At step 128, ibook server application 64 generates a contributor ID for the contributor. The contributor ID is used to access the ibook with which the contributor has enrolled. If desired, the contributor ID can be used in conjunction with additional security measures, such as a password, etc. The contributor enrollment process ends at step 130.

Figure 6:
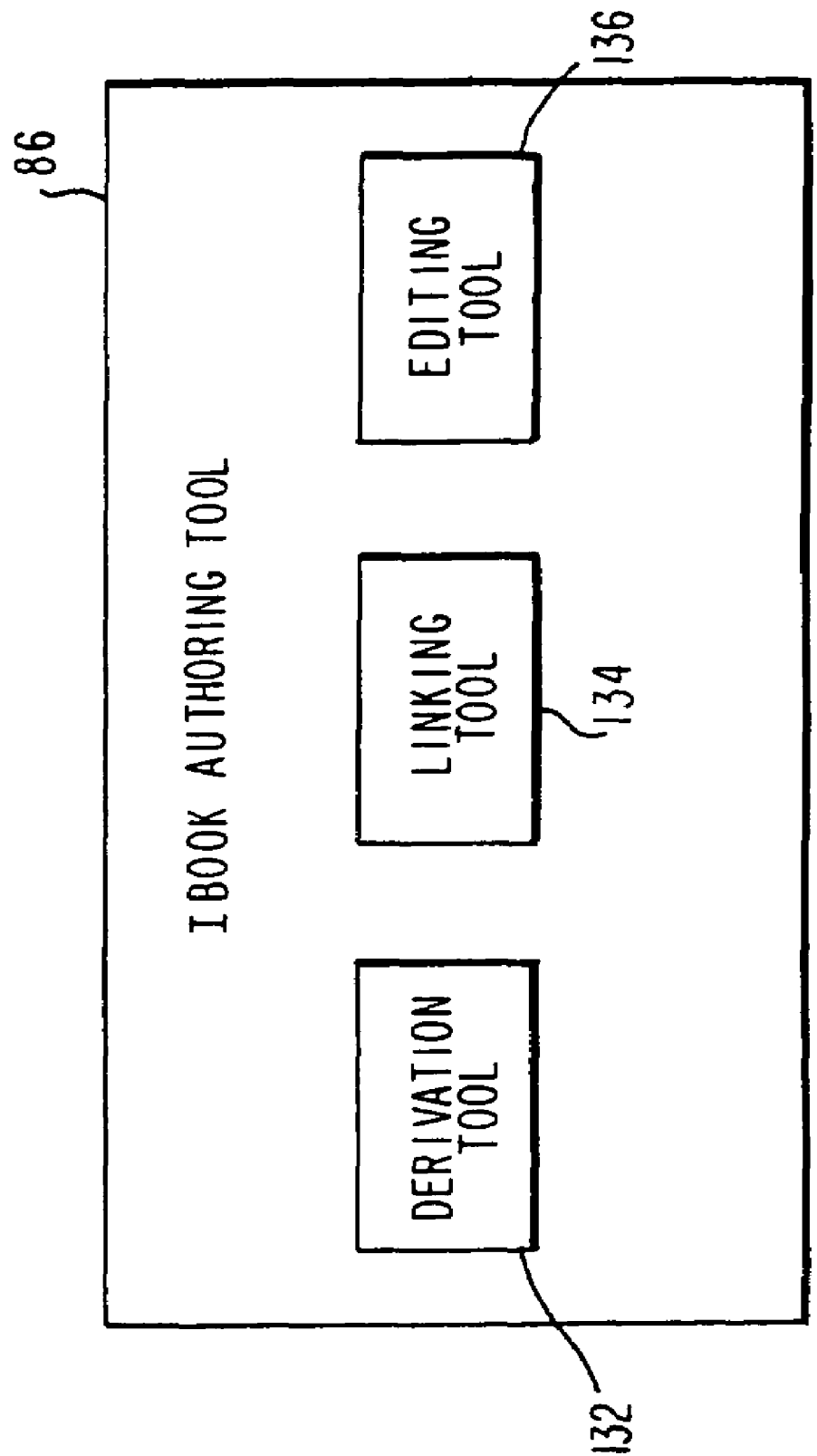
FIG. 6 is a diagram of an interactive Web book authoring tool.

Once enrolled with an ibook, a contributor may view material in the ibook, may create new original material, or may contribute material derived from that contributed by other contributors to create a derivation. Derivation types supported by the ibook system include alternate versions, commentaries, quotations, revisions, combinations, sequels, transcriptions, invocations, alternate resolutions, and collaborations. To create or modify material in an ibook, a contributor uses ibook authoring tool 86 (FIG. 3). As shown in FIG. 6, ibook authoring tool 86 includes derivation tool 132, linking tool 134, and editing tool 136. Editing tool 136 is used to enter original material and linking tool 134 is used to create hypertext links to existing material.

Derivation tool 132 is used to create material based on existing material. Preferably, derivation tool 132 provides style templates for different types of derivations. When a contributor wishes to create a derivation based on existing material, the contributor selects from the available derivation types (e.g., alternate version, commentary, quotation, revision, combination, sequel, transcription, invocation, alternate resolution, and collaboration). When the contributor creates the derivation, (e.g., by creating commentary based on an existing video work), derivation tool 132 automatically or semi-automatically generates attribution information identifying the work from which the derivation was derived. Attribution information may be automatically generated by navigation tool 132 when a contributor creates a derivation of existing source code (e.g., using the contributor's compiler).

The functions provided by authoring tool 86 may differ depending on the content of a particular ibook passage. For example, editing tool 136 preferably supports standard word processing functions for entering text and source code and supports graphics, animation, audio, and video editing functions for creating and modifying multimedia material. Editing tool 136 also preferably supports creation of audio material from telephone calls and audio-visual material from video conferencing sources. Authoring tool 86 preferably prevents the deletion of previously contributed material and facilitates the creation of material derived from previously contributed material.

Figure 7:
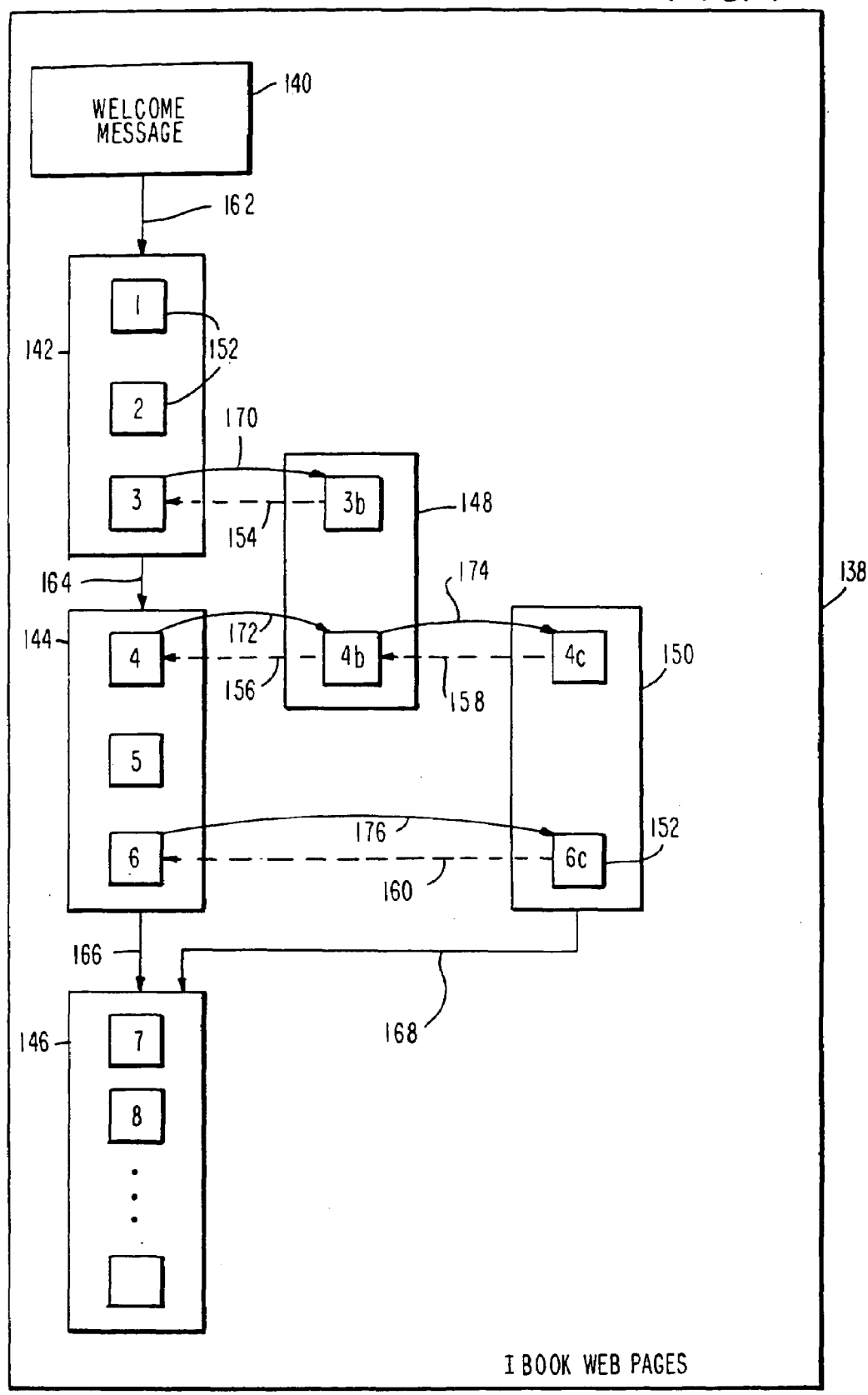
FIG. 7 is a detailed diagram of the structure of an interactive Web book.

The structure of the content of an illustrative ibook is shown in detail in FIG. 7. The material contributed to an ibook is contained in one or more Web pages. The content of the ibook Web pages is preferably stored in ibook Web pages database 76 (FIG. 3). Ibook Web pages 138 may contain both static Web pages and Web pages with content that changes dynamically whenever referenced. Web pages 138 include welcome message page 140 to introduce a user to the ibook. If desired, welcome message page 140 can include summary information concerning the content of ibook web pages 138. For example, welcome message page 140 can include information regarding the authors who have contributed material, the dates on which material was contributed, the sponsor's description of the theme of the ibook, the specific subject matter contained in the ibook, the media used, etc. Welcome page 140 preferably includes hypertext links to viewer, contributor, and sponsor enrollment pages. It is not possible to proceed past welcome page 140 without enrolling with the ibook. After viewing welcome message page 140 and completing an appropriate enrollment process, users can view, add, or create derivative material using authoring tool 86 (FIGS. 3 and 6).

In FIG. 7, ibook Web pages 142, 144, 146 were contributed by contributor Smith, ibook Web page 148 was contributed by contributor Jones, and ibook Web page 150 was contributed by contributor Brown. Contributor Smith was the first contributor, and his pages were added as original material. Contributor Jones added material that was based on some of the material contributed by contributor Smith. Contributor Brown added material that was based on material contributed by Smith and material contributed by Jones.

Web pages 142, 144, 146, 148, and 150 are preferably organized in the form of one or more passages 152. For example, ibook Web page 142 contains passages 1, 2, and 3 and ibook Web page 150 contains passages 4c and 6c. The amount and type of material contained in a passage may depend on the type of media used. If an ibook contains only text, passages 152 may be paragraphs. Alternatively, passages 152 may be characters, words, sentences, paragraphs, sections, or chapters. If an ibook contains multimedia material, passages 152 can be graphic images, animation sequences, portions of a sound track, still video images, or video clips. If an ibook contains executable material, passages 152 can be modules of code.

When an ibook contributor adds material that is based on the material previously contributed by another contributor, attribution information is preferably automatically generated that keeps track of the identity of the source of the material. The attribution information may be provided, for example, in the form of attribution links 154, 156, 158, and 160 between passages 152.

Attribution link 154 indicates that passage 3b, which was contributed by Jones, was based on passage 3, contributed by Smith. Similarly, attribution link 160 indicates that passage 6c, which was contributed by Brown, was based on passage 6, contributed by Smith. Attribution link 156 indicates that Jones contributed passage 4b based on passage 4 of Smith. Attribution link 158 indicates that Brown contributed passage 4c based on passage 4b of Jones.

Attribution information is preferably automatically generated when a contributor copies existing ibook material. For example, contributor Jones may have used a cut and paste feature in derivation tool 132 to cut and paste text or multimedia material from passage 3 when creating passage 3b. During the process of cutting and pasting from passage 3 to passage 3b, authoring tool 86 automatically generates attribution information including attribution link 154.

Another way in which attribution information can be generated is when a contributor selects a certain derivation style template with derivation tool 132, prior to contributing new material. After the style template is selected, derivation tool 132 prompts the contributor for attribution information, which is used to automatically create attribution links that relate the new material to the original material. For example, Jones may select the derivation type commentary, in order to create a commentary based on passages 3 and 4 of Smith's work. Derivation tool 132 queries Jones as to the authorship of the material on which the commentary is based. Jones must enter suitable information identifying the original contributor's material. Derivation tool 132 preferably will not let Jones proceed until valid attribution information has been provided. If desired, a system supervisor can monitor the creation and use of attribution information, such as the implementation of attribution links 154, 156, 158, and 160.

Sequence links 162, 164, and 166 are hypertext links that link welcome message page 140 and ibook pages 142, 144, and 146. Sequence links 162, 164 and 166 were created by authoring tool 86 when contributor Smith created ibook Web pages 142, 144, and 146. Sequence link 168 was created by contributor Brown using linking tool 134 (FIG. 6). The creation of sequence links such as sequence link 168 is at the discretion of the contributor.

Derivation links 170, 172, 174, and 176 are another type of link that is formed in connection with ibook web pages 142, 144, 146, 148, and 150. Derivation links 170, 172, 174, and 176 preferably point in the opposite direction of attribution links 154, 156, 158, and 160. Whenever a derivation link is formed of an existing passage, a derivation link is formed that indicates that the derived passage has been formed.

Derivation links 170, 172, 174, and 176 are preferably automatically generated when passages 3b, 4b, 4c, and 6c are created. For example, if a contributor uses a cut and paste feature in derivation tool 132 to cut and paste material from one passage to another, authoring tool 86 automatically generates derivation information including derivation links 170, 172, 174, and 176.

The derivation information for each passage 152 (e.g., the existence and identity of any associated derivation links for a given passage) and the attribution information (e.g. the existence and identity of any associated attribution links for a given passage) are used by navigation tool 84 when a user navigates through the material in an ibook. For example, when a user views a passage that has a corresponding derivation, the user can be alerted that the derivation exists and can be given an opportunity to view the derivation. Likewise, when a user views a passage that is a derivation, the user can be alerted that a corresponding original exists. Derivation information and attribution information may be stored in passage database 74 (FIG. 3).

Multigenerational derivation and attribution relationships exist between passages 152 (e.g., between passages 4 and 4c in FIG. 7). These relationships may either be represented by links between immediately adjoining passages (e.g. 4 and 4b or 4 and 4c) as shown in FIG. 7, or may be represented by direct links between nonadjoining passages (e.g., between passages 4 and 4c).

In addition, during the creation of passages 152 authoring tool 86 and ibook server application 64 cause information to be stored in passage database 74 that identifies which Web page 138 contains each passage 152. Information regarding the content of passages 152 ("passage characteristics") is preferably also stored during passage creation. Passage characteristics include the identity of the passage's contributor (which may be stored in contributor database 68), the media (e.g., text, audio, video), the time and date of passage creation, the language of the passage, the interpreter for the passage if the passage is executable code, and the subject matter of the passage. Some of these passage characteristics can be determined automatically by ibook system 52. For example, the identity of the contributor can be determined from the ID number of the contributor. Other passage characteristics might be more easily entered by the contributor, such as the language of the material in the passage. Regardless of how the passage characteristics are entered into system 52, these characteristics are preferably stored in passage database 74 and are used during navigation through the ibook.

Figure 8:
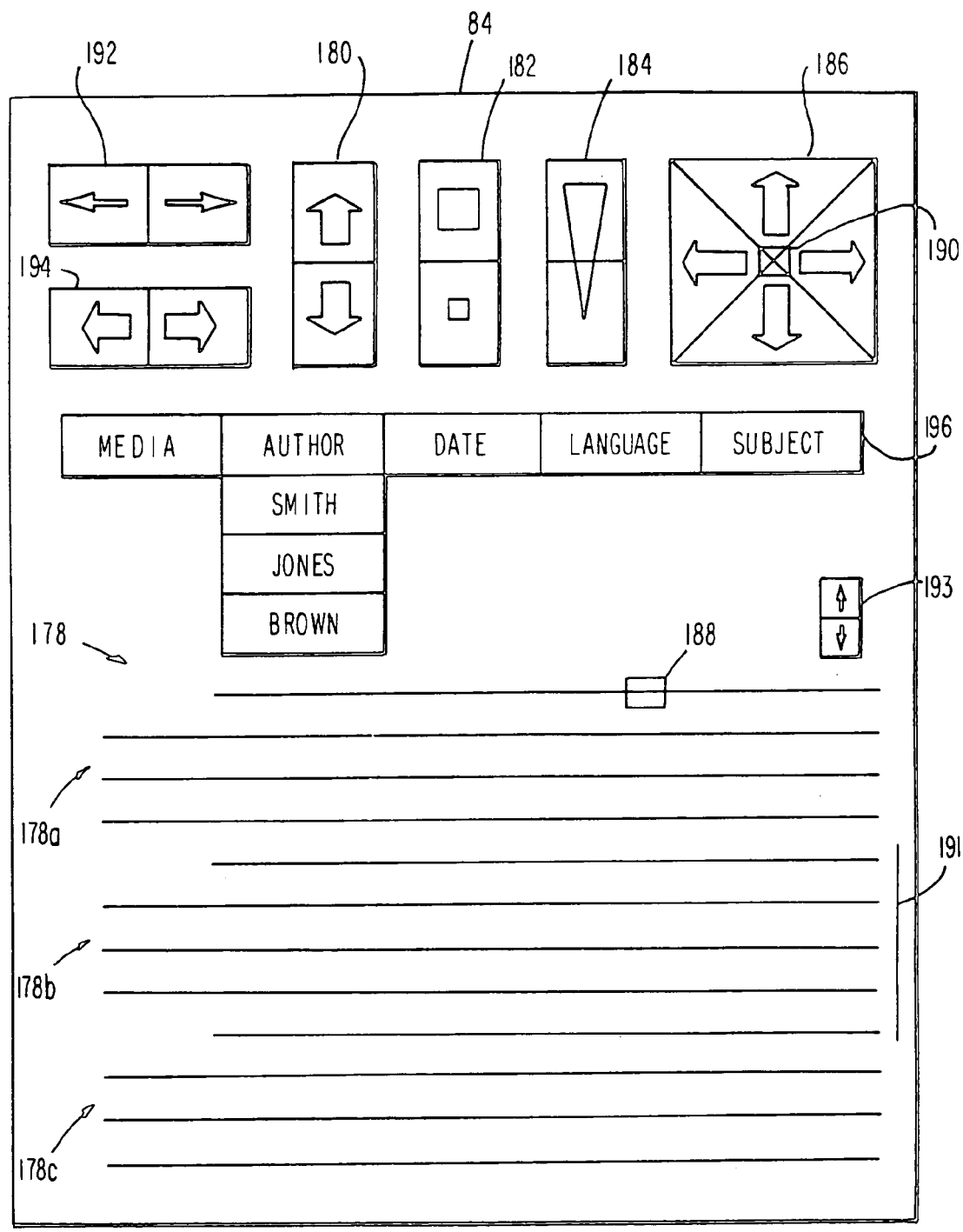
FIG. 8 is a diagram of an interactive Web book navigation tool.

An illustrative ibook navigation tool 84 is shown in FIG. 8. In FIG. 8, passages 152 are illustrated as paragraphs of text 178. In a multimedia environment, passages 152 would be multimedia segments presented on a computer monitor as video accompanied by sound. When passages 152 are executable modules, navigation tool 84 presents the passages by downloading and executing the passages. Style buttons 180 allow a user to select a desired format for the presentation of information on client 60. Each style is controlled by an ibook passage (e.g., a Java program) which implements that style. Suitable styles include a Microsoft Windows 3.1 format with a title bar at the top of the screen or a photorealistic style, in which navigation controls are displayed in a realistic manner (e.g., as a desk containing a file drawer, etc.). Window size buttons 182 allow the user to adjust the size of the window containing ibook navigation tool 84 when Web browser 82 is operating in a windows-type environment. Magnification buttons 184 allow the user to adjust the magnification of the contents of the display window.

Cursor keys 186 move cursor 188 up, down, left, or right within a passage 152 on a given ibook Web page 138. If desired, inner portion 190 of cursor keys 186 can be used to provide slow cursor movement. Whenever a user moves cursor 188 into a passage that has an associated derivation or original, the user may be alerted. For example, bar 191 may be provided in parallel with passage 178b to indicate that a derivation or original exists for that passage, which the user may wish to view. Navigation tool 84 determines when to display bars such as bar 191 based on the derivation information (i.e., derivation links 170, 172, 174, 176 and derivation type information) and attribution information stored in passage database 74. Derivation traverse buttons 192 preferably light up when cursor 188 enters a passage (such as passage 178b) that has an associated derivation or original.

Clicking on the right derivation traverse button causes navigation tool to present, e.g., the next most recent derivation associated with that passage and clicking on the left derivation traverse button produces the opposite result. For example, if a user is viewing passage 4b (FIG. 7) and the right derivation traverse button 192 is selected, navigation tool 84 displays the contents of passage 4c. If, however, a user is viewing passage 4b and the left derivation traverse button 192 is selected, navigation tool 84 displays the contents of passage 4.

Back and forward buttons 194 allow a user to navigate along a browsing trail through Web pages 138 that has been defined by the user or a contributor who has previously navigated through the material using scroll buttons 186 and derivation traverse buttons 192. Volume buttons 193 control the sound volume in multimedia material. Multiple volume control buttons are preferably provided to control the mix when playing audio tracks in parallel.

An additional navigation control feature provided by navigation tool 84 is drop-down menu 196. The user can make selections with drop-down menu 196 that aid in navigating ibook passages 152. For example, drop-down menu 196 may contain a list of all derivations and original material associated with the passage that the user is currently viewing. The user can navigate to one of these derivations or originals by selecting a desired entry or entries from the list. Drop-down menu 196 can also contain a list of common passage characteristics, such as media type, identity of contributor, date of creation, language, and subject matter (e.g., as predefined by keywords entered by the contributor or extracted from passages 152 automatically by the ibook system). If desired, a user can view only the works of Jones by selecting "Jones" from drop down menu 196. Similarly, if the user were only interested in viewing material in English, the user could select English under the drop-down menu heading entitled "language."

If desired, the manner in which passages 152 are presented to a viewer by navigation tool 84 may be based in part on derivation type information associated with a passage. For example, if a passage is a revision of a previous passage, navigation tool 84 can, as a default, present only the most recent version of the passage. If a passage is an alternate version of another passage, navigation tool 84 can, as a default, offer the user a choice of viewing either passage. If a passage is a transcription of another passage, then navigation tool 84 can present both the original passage and the transcribed passage on the screen of client 60 at the same time, in a split screen format. Navigation tool 84 could give priority to a particular media (such as video) when derivations of the same passage are present in more than one type of media. Viewer preferences that may be used to automatically chose between alternative passages are preferably stored in the viewer database 66. If a passage is a combination, navigation tool 84 may enable a user to view the components of the combination sequentially (e.g., when the components are chapters in a book) or in parallel (e.g., when the components are audio tracks in a song).

As a user views passages 152, ibook server application 64 preferably stores information concerning which passages have been accessed in access database 70. Web browser 82 and ibook navigation tool 84 are also involved in keeping track of the length of time a user views each passage. This information is used to reward the contributors whose material is viewed. In addition, the contributors whose material was used to form the basis of the viewed work are rewarded. Contributors may therefore be compensated, even if their work is not accessed and viewed directly by the user. For example, if Smith contributes a book and Jones writes an alternate chapter, both Jones and Smith may be rewarded when the alternate chapter is viewed. The process of rewarding contributors may be substantially automatic and may be administered by ibook server 24 of the current ibook sponsor or may be administered by ibook server 22 at the ibook parent organization.

Figure 9:
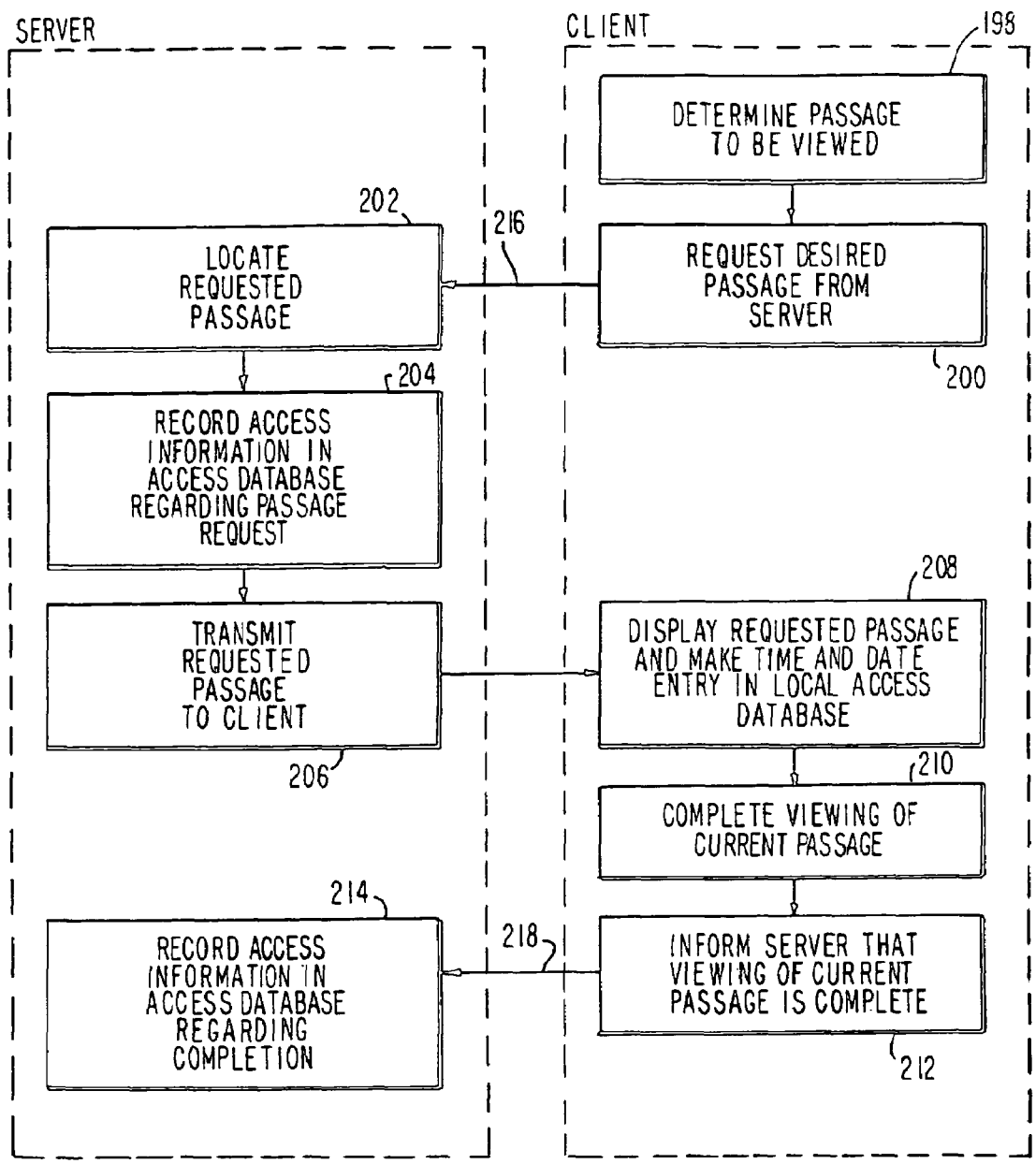
FIG. 9 is a flow chart of the process by which a user at a client accesses material at a server.

As the user navigates through an ibook using navigation tool 84, navigation tool 84 transmits certain access information to server 56, making requests to view material. The steps involved in processing and storing the access information are shown in FIG. 9. At step 198, the user at client 60 determines which passage is to be viewed, for example, by using the various buttons provided by navigation tool 84 (FIG. 8). Navigation tool 84 preferably generates a request to view a desired passage and transmits this request to server 56 at step 200. Server application 64 at server 56 receives the request and locates the requested passage in ibook Web pages database 76 at step 202. At step 204, server 56 records information about the access request, such as a time and date entry identifying when the requested access took place. Server 56 transmits the requested passage to client 60 at step 206. Client 60 displays the passage and may make a time and date entry in local access database 92 at step 208. If time and date entries are made in local access database 92, this information is periodically made available to server 56 for storage in access database 70. At step 210, the user completes viewing of the passage and at step 212, client 60 transmits information indicating that viewing is complete to server 56. At step 214, server 56 records access information in access database 70 that indicates when the viewing of the passage was completed, e.g., by making a time and date entry.

As defined herein, the term "access information" includes information such as a passage identifier, time and date entries, and information indicating the nature of the transmission from client 60 to server 56. The passage identifier is preferably a universal resource locator (URL) for the passage requested from the ibook Web pages database 76. The information indicating the nature of the transmission indicates whether the transmission from client 60 to server 56 is a request for the display of a passage (shown by arrow 216) or is a transmission indicating that the user has completed viewing the passage (shown by arrow 218).

Figure 10:
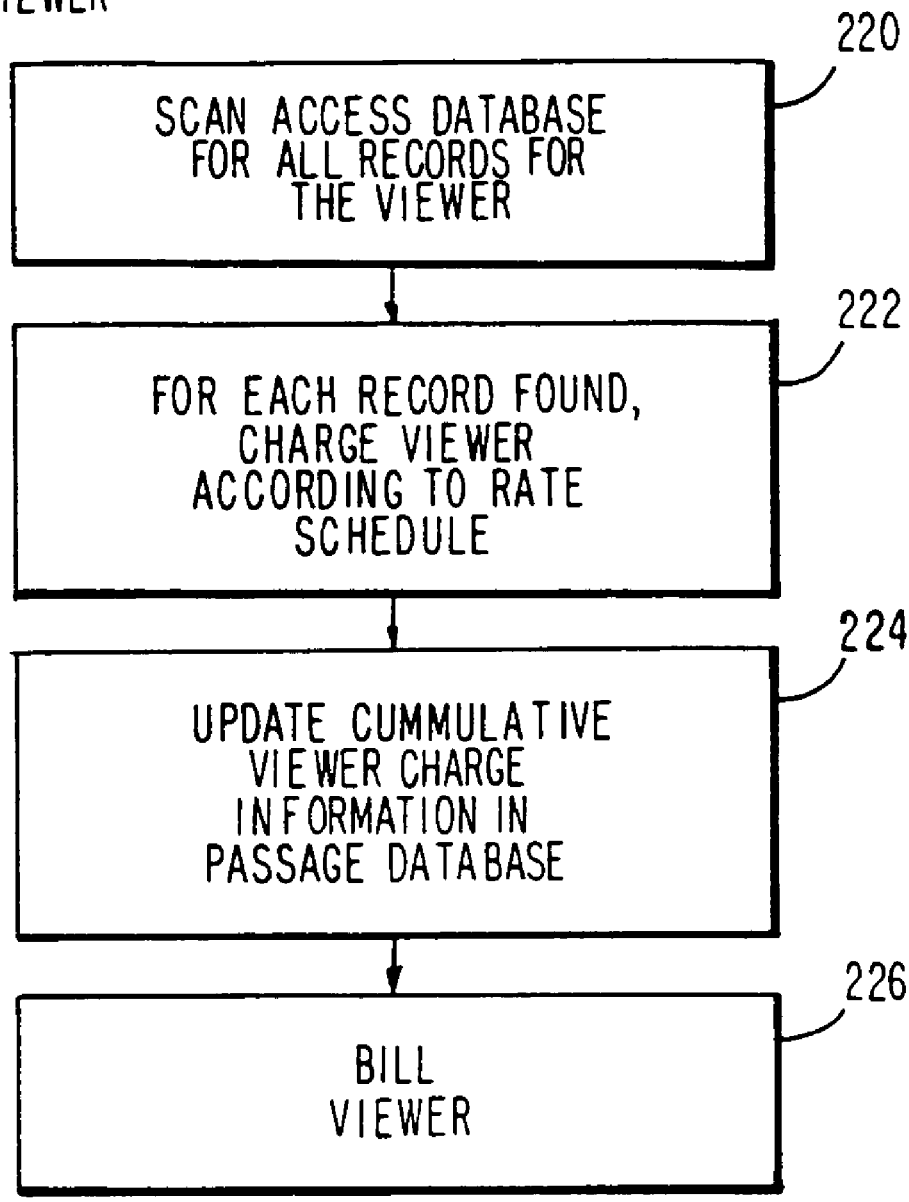
FIG. 10 is a flow chart of the process of determining the amount of ibook material a user has viewed and billing the user accordingly.

Ibook functions related to revenue collection and distribution are preferably provided by ibook demons 78 (FIG. 3). An illustrative revenue collection process that is implemented with an ibook demon 78 is shown in FIG. 10. The revenue collection process shown in FIG. 10 may be run periodically (e.g., once per day). As shown in FIG. 10, server 56 scans access database 70 to collect all access records for the user who has viewed material at step 220. The access records contain information regarding the number of accesses of ibook material that were made and the start and stop times of each access. At step 222, server 56 charges the user who has viewed material according to a predetermined rate schedule. For example, the user can be billed based on the on-line time spent by the user accessing ibook material or the user can be billed based on the number of accesses made. If desired, the user can be billed at a flat rate. At step 224, the users's account balance is adjusted accordingly. The user is billed (e.g., by mail or automatic credit card debit) at step 226.

Figure 11:
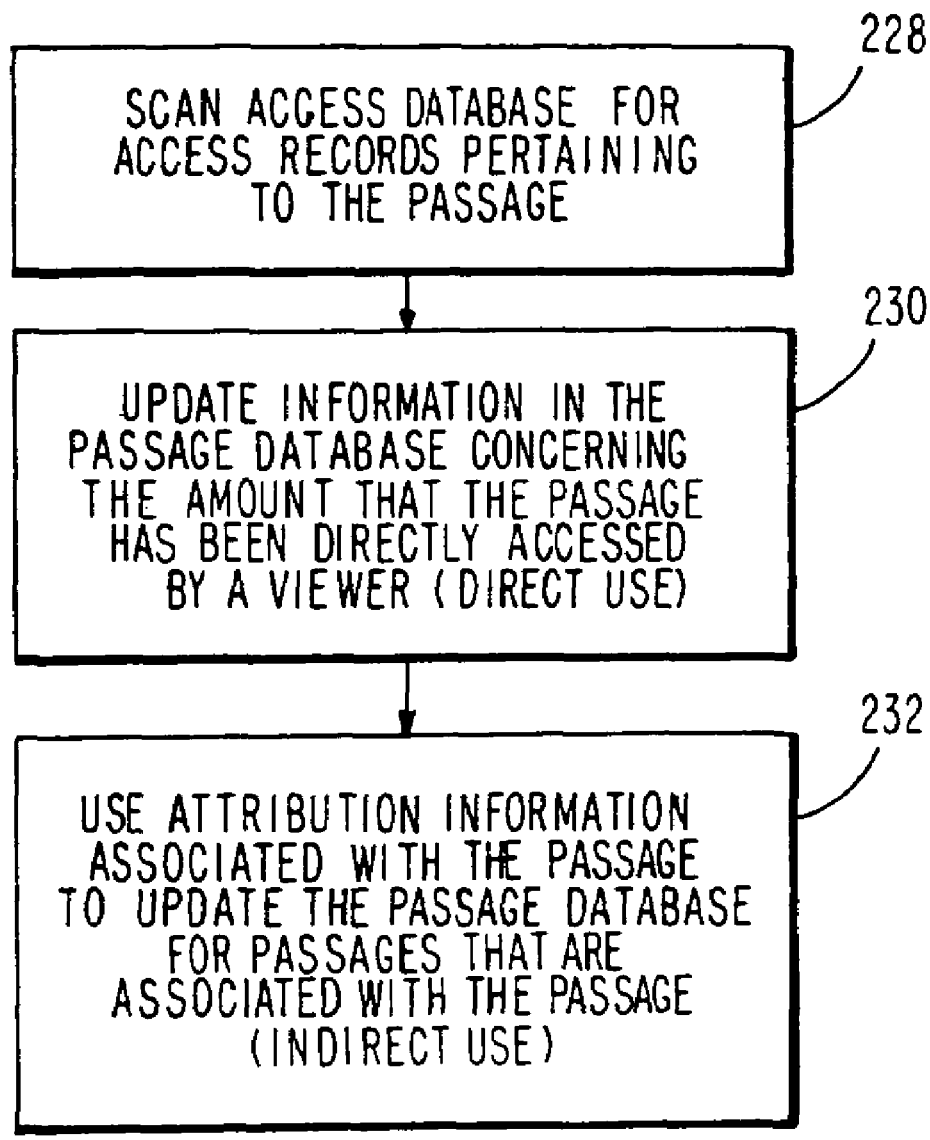
FIG. 11 is a flow chart of the process of updating the passage database to reflect the amount that the passages have been directly used by viewing or indirectly used.
Figure 12:
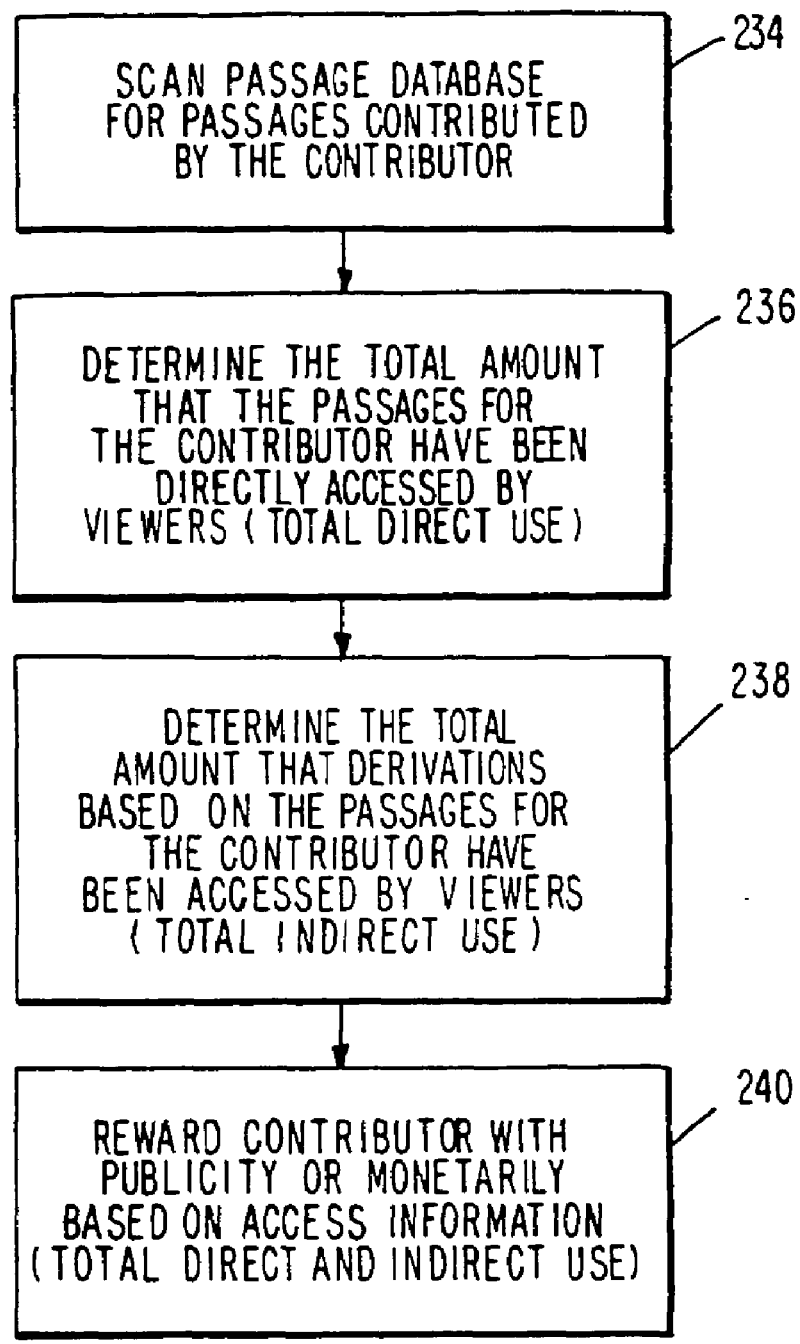
FIG. 12 is a flow chart of the process of determining the amount that each contributor's material has been used and rewarding the contributors accordingly.

Automatic revenue distribution may be performed by ibook demons 78 that implement the processes shown in FIGS. 11 and 12. FIG. 11 shows a process for collating passage information from access database 70. The steps shown in FIG. 11 are performed for each passage in ibook Web pages database 76. At step 228, access database 70 is scanned for records containing access information pertaining to the passage. At step 230, server 56 uses these records to update passage database 74 to reflect the amount that the passage has been directly accessed by a viewer (e.g., using navigation tool 84, as shown in FIG. 9). The "amount" that the passage has been accessed can be determined based on the cumulative access time for that passage and/or the number of "hits" the passage has received (as determined from the access information in the access database). When a contributor's material is directly accessed by the user, the material is being directly used and the contributor is rewarded based on the amount of that access.

Preferably, a contributor is also rewarded when a derivation based on the contributor's material is accessed. When the derivation is accessed, the contributor's material is being indirectly used. At step 232, server 56 uses attribution information associated with each passage that has been accessed to determine whether the passage was based on the work of another contributor. If the passage was based on the passage of another contributor, the passage database 74 is updated based on the attribution information. There are preferably separate data fields associated with each passage in passage database 74 that allow passage database 74 to maintain a record of the amount of direct and indirect usage for each passage. For example, each passage can have associated data fields in which the number of direct hits and the number of indirect hits (i.e., hits on a derivation based on the passage) are stored.

After the process of FIG. 11 is used to update the passages in passage database 74 to reflect the amount of direct and indirect usage of these passages by users, the process of FIG. 12 is used to collate this information for each of the contributors and to reward the contributors accordingly. The process steps of FIG. 12 are performed for each contributor. At step 234, server 56 scans passage database 74 for the passages contributed by the contributor. The total amount that these passages have been directly used (e.g., when a viewer directly accesses a passage) is determined at step 236. For example, if each of the contributor's passages in the passage database 74 has an associated data field that indicates the amount of direct use for that passage, step 236 involves totaling the amount of such direct use for all of the passages. The total amount that the contributor's passages have been indirectly used (e.g., when a viewer accesses a derivation based on the contributor's passage) is determined at step 238. For example, if each of the contributor's passages in the passage database 74 has an associated data field that indicates the amount of indirect use of those passages, step 238 involves totaling the amount of such indirect use for all of the passages.

The contributor is rewarded at step 240. If desired, the contributor may receive a non-monetary reward. For example, ibook server 56 may publicly post the amount that the contributor's material receives hits, which serves to reward contributors with publicity regarding the popularity of the material they contribute. Contributors may also be rewarded by distributing revenue that has been collected from the users with the process of FIG. 10 or that has been generated by licensing intellectual property developed by the community of contributors associated with an ibook. Preferably, the contributor is rewarded based on both the direct use of the contributor's material (e.g., by direct viewer access) and on the indirect use of the material (e.g., access of a derivation based on the contributor's material).

Monetary rewards may be distributed automatically, e.g., by crediting the bank accounts of the relevant contributors. Preferably, the sponsor of the ibook that is viewed is also rewarded. If desired, the ibook parent organization may be compensated. If the structure or content of an ibook (e.g., ibook A in FIG. 1) is replicated to form a second ibook (e.g., ibook A' in FIG. 1), this information (or references to this information) is stored in ibook offspring database 72 and may be used to compensate the sponsor and contributors of the parenting ibook (ibook A) for revenue derived from the offspring ibook (ibook A').

Figure 13:
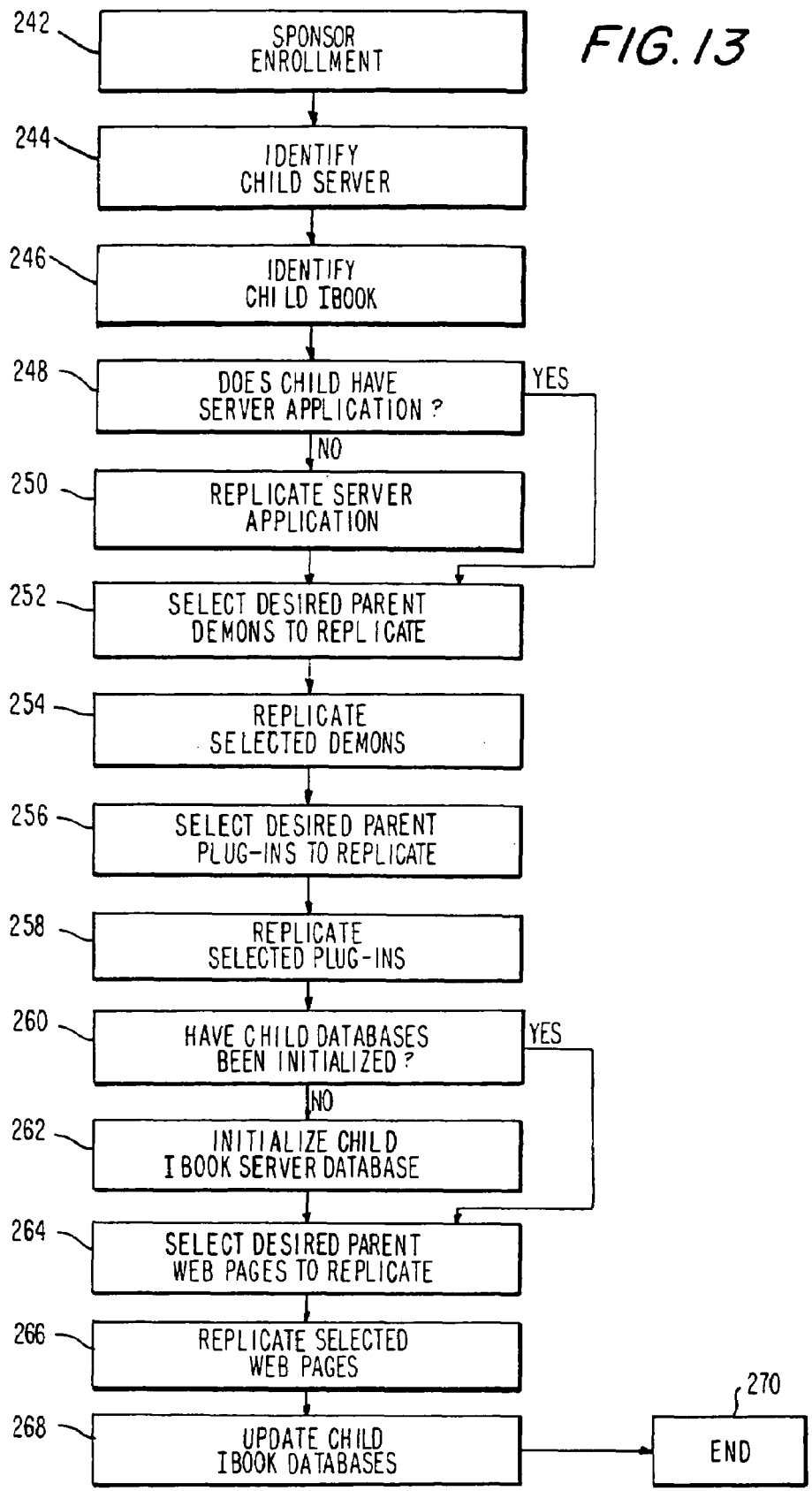
FIG. 13 is a flow chart of the process of replicating an ibook.

The replication function used to replicate ibook A' from ibook A in FIG. 1 may be provided by a program that prompts an enrolled sponsor for information concerning the replication process (i.e., by a wizard program). The program used for replication is preferably a downloadable plug-in, such as ibook replication tool 90 (FIG. 3). Steps involved in replication of an ibook are shown in FIG. 13. At step 242, a potential sponsor completes an enrollment process similar to the viewer and contributor enrollment processes shown in FIGS. 4 and 5. During the enrollment process, the nature, obligations, and benefits of becoming a sponsor of an ibook are explained. A sponsor who has already created a new ibook may enroll with additional ibooks so that the sponsor will be permitted to replicate material from any such additional ibooks into the new ibook. If the sponsor agrees to the rules governing ibook sponsorship and the replication of material from an existing ibook, the sponsor is enrolled.

At step 244, the sponsor specifies the identity of the child ibook server onto which a new ibook is to be placed or onto which additional material is to be replicated. At step 246, the sponsor specifies the identity of the new ibook. At step 248, it is determined whether the child server identified at step 244 has a server application installed. If the server application is not installed, server application 64 from the parent ibook with which the sponsor has enrolled is replicated (e.g. by downloading or referencing) at step 250. If server application 64 is already installed, step 250 is bypassed. At step 252, the sponsor selects which ibook demons 78 it is desired to replicate from the parent server to the child server. The selected demons 78 are replicated at step 254. At step 256, the sponsor selects which ibook parent plug-ins 80 are to be replicated onto the child server. The selected plug-ins are replicated at step 258. At step 260, it is determined whether ibook databases have been initialized on the child server. If not, the child ibook server databases are initialized at step 262. If the child ibook server databases have already been initialized, step 262 is bypassed.

At step 264, the sponsor decides whether content of the parent ibook (e.g., in the form of text or multimedia information stored in ibook Web pages database 76 and linking information stored in passage database 74) should be replicated from the parent server onto the child server. The selected ibook Web pages and associated linking information are replicated from the parent server to the child server at step 266. The child ibook databases are updated at step 268. Information concerning the replication process is stored in offspring database 72. Replication terminates at step 270. The content of multiple ibook parents can be merged into a single child ibook by repeating the process of FIG. 13.

Because the ibook can be replicated, successful ibooks can spawn additional ibooks. Further, since ibooks may be created to specifically support certain media or themes, different ibooks may spawn different families of offspring ibooks each of which has an associated community of interested users.

In order to ensure that the presence of an ibook is known to those who would be interested in contributing to or viewing the content of the ibook, ibooks preferably support various functions for advertizing their presence to popular search engine databases. Suitable search engines to which the ibook can advertize its presence include Yahoo, Alta Vista, and Lycos. One suitable way in which to advertise the presence of an ibook is for ibook server application 56 (FIG. 3) to send suitably formatted e-mail messages to the Web site manager at the Web site address associated with the various search engines. As shown in FIG. 1, search engine server 36 contains Web index 40. Ibook server application 64 or an ibook demon 78 may automatically extract hypertext markup language (HTML) keyword information from the ibook Web pages stored in ibook Web pages database 76 and/or the passage characteristics for these Web pages stored in ibook passage database 74 and submit this information for inclusion in Web index 40. Ibook authoring tool 84 preferably also presents the contributor with queries for keywords during the authoring process. This keyword information can also be submitted for inclusion in Web index 40.

If desired, the ibook server associated with the ibook parent organization can be used to support a comprehensive database. The ibook server application 64 of each existing ibook can provide keyword and other ibook indexing information to this database.

Figure 14:
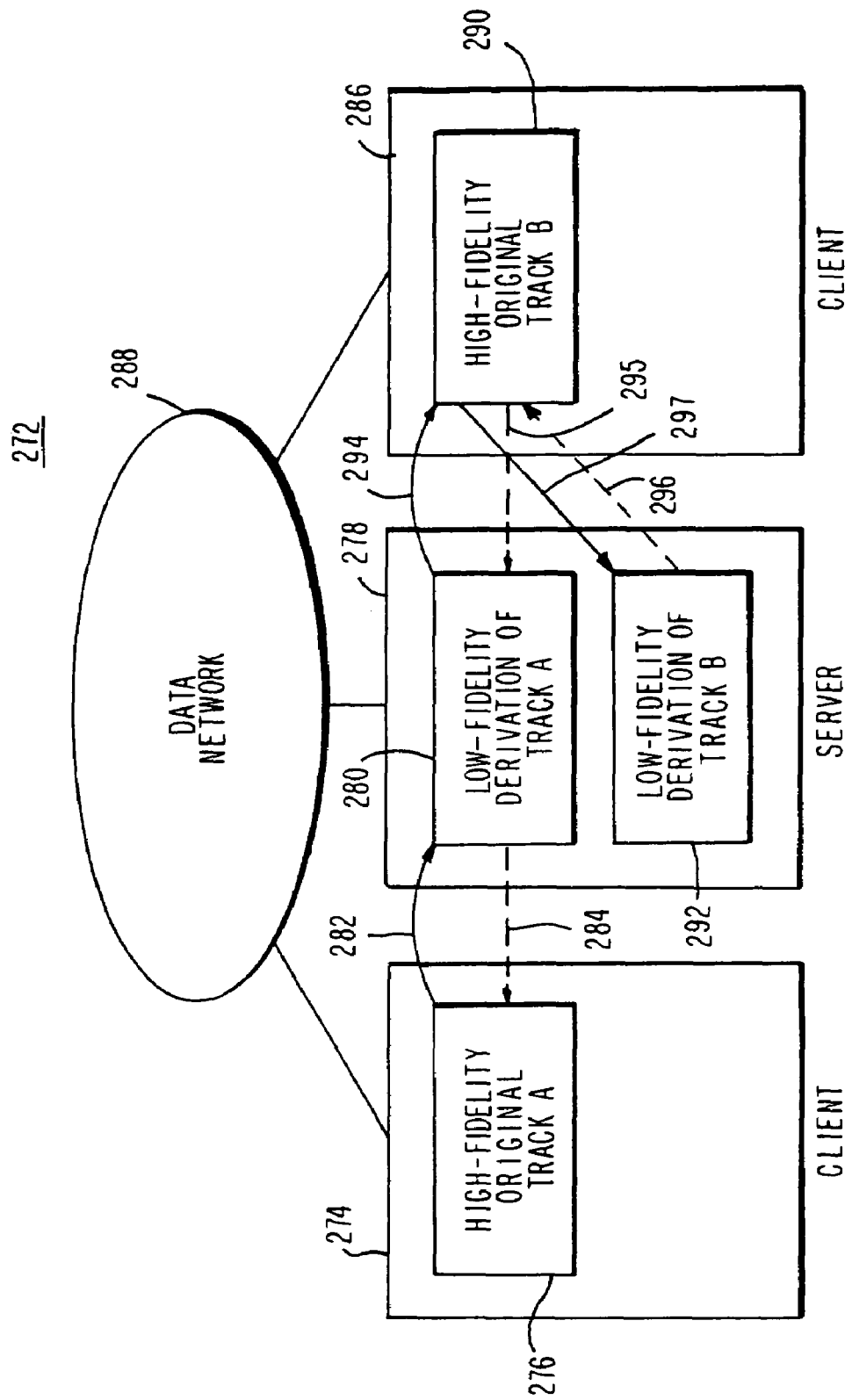
FIG. 14 is a system diagram showing how ibook content may be distributed among clients and servers.

Certain aspects involved in using an ibook system to facilitate the creation of musical works are shown in FIG. 14. In ibook system 272, a first composer at client 274 records a high-fidelity track (track A) in the form of ibook passage 276 using ibook authoring tool 86. For example, the first composer may create a rhythm guitar track to form the basis of a new song. Because high-fidelity audio requires a substantial amount of memory to store, the first composer can create a low-fidelity derivation of track A on server 278 as passage 280 and make this version available to other ibook contributors. Passage 280 is an alternate resolution derivation of passage 276 and has an associated derivation link 282. Attribution link 284 shows that passage 280 was derived from passage 276.

The low-fidelity version of track A in passage 280 can be viewed (listened to) by a second composer at client 286, who can then add material, such as a vocal track. Low-fidelity passage 280 contains less information than the corresponding high-fidelity passage 278, so it is easier to provide passage 280 to client 286. The second composer may listen to the contents of passage 280 in realtime over data network 288, or a local copy of passage 280 can be downloaded onto client 286. Playback of low-fidelity track A may be accomplished using navigation tool 84. If desired, the second composer can use authoring tool 86 to add a vocal track, while listening to the rhythm guitar track of the first composer. A high-fidelity version of the vocal track (track B) can be stored on client 286 in passage 290. Passage 290 is a collaboration derivation of passage 280 and has an associated derivation link 294 and attribution link 295. The second composer can create a low-fidelity version of track B on server 278 in passage 292. Passage 292 is an alternate resolution derivation of passage 290 and has an associated derivation link 297. Attribution link 296 shows that page 292 was derived from page 290.

Authoring tool 86 preferably supports the automatic generation of derivation and attribution information during the process of recording new tracks based on previously contributed tracks. Ibook navigation tool 84 allows users to listen to multiple tracks in parallel, in the form of a song. Users can select which tracks are played back and the mix of the track using tools such as drop down menu 196 and volume buttons for each track. For example, the user can elect to hear only those tracks contributed by a certain composer. In addition, contributors can create songs by copying selected tracks and editing them using authoring tool 86.

Server 278 maintains sufficient information concerning original passages 276 and 290 to allow passages 276 and 290 to be copied to server 278 or any suitable location upon request. For example, server 278 may contain the URLs of passages 276 and 290 in ibook databases such as passage database 74 and ibook Web pages database 76. If desired, the URLs of passages 276 and 290 can be used by navigation tool 84 and authoring tool 86 to play back the high-fidelity versions of tracks A and B.

Although various information concerning the ibook passages, such as derivation linking information, derivation type information, passage characteristics, and attribution information have been described as being stored in passage databases, a suitable alternative is to store this information in the Web pages that contain the passages or as a set of relations and tables in a suitable relational database, or as a set of objects in an object database. Another suitable alternative is to use linking technology, such as Object Linking and Embedding (OLE) or Component Object Model (COM) technology to represent the passages and their attribution and derivation relationships.

Various techniques may be used to represent the contents of ibook Web pages (e.g., the ibook Web pages in ibook Web pages database 76). For example, ibook Web pages may be represented by static data. Alternatively, ibook Web pages may be represented by code that is capable of generating the Web page contents, e.g., code that generates the entries of a table or list. If desired, ibook Web pages on a given server or client may be represented by a reference (e.g., a URL) to material that is actually stored elsewhere in the data network.

In addition, although the data network preferably supports the HTML protocol that is commonly used to implement World Wide Web communications (because the HTML format has the advantages of standardization, wide-use, and sufficient capacity to implement the features of the ibook system), other protocols may be used, such as one based on Virtual Reality Modeling Language (VRML) or Structured Generalized Markup Language (SGML) or any client-server transaction-based packet-switched protocol.

The foregoing is merely illustrative of the principles of this invention and various modifications can be made by those skilled in the art without departing from the scope and spirit of the invention.

What is claimed is:

1. A method for managing interactive web books, comprising:
    allowing a sponsor to set up an interactive web book;
    allowing contributors to contribute material to the interactive web book;
    allowing contributors to create derivations of material in the interactive web book; and compensating both the sponsor and the contributors.

2. The method of claim 1, further comprising generating attribution information identifying the contributors whose material is used to create the derivations.

3. The method of claim 2, further comprising automatically rewarding the contributors based on the amount that their material is accessed by users and the attribution information.

4. The method of claim 3, wherein the automatically rewarding the contributors further comprises automatically making monetary distributions to the contributors.

5. The method of claim 4, wherein the derivation type is an alternate version.

6. The method of claim 4, wherein the derivation type is a commentary.

7. The method of claim 1, wherein the creating derivations comprises allowing a contributor of derivative material based on previously contributed material to enter a derivation type to be associated with the derivative material.

8. The method of claim 1, further comprising providing Web pages in the form of a plurality of passages and allowing a contributor to enter passage characteristics associated with each passage.

9. The method of claim 1, further comprising automatically generating a derivation link from each previously contributed material to each of the derivations based on that previously contributed material, wherein the user navigates from the previously contributed material on which a given derivation is based to the given derivation using one of the derivation links.

10. A method for managing interactive web books, comprising:
    supporting a first interactive web book;
    allowing a sponsor to replicate the first interactive web book to create a second interactive web book;
    allowing contributors to create derivations of material in the interactive web book; and
    compensating contributors of the first interactive web book based on revenue derived from the second interactive web book and/or the derivations.

11. The method of claim 10, further comprising generating attribution information identifying the contributors whose material is used to create the derivations.

12. The method of claim 11, further comprising automatically rewarding the contributors based on the amount that their material is accessed by users and the attribution information.

13. The method of claim 12, wherein the automatically rewarding the contributors further comprises automatically making monetary distributions to the contributors.

14. The method of claim 13, wherein the creating derivations comprises allowing a contributor of derivative material based on previously contributed material to enter a derivation type to be associated with the derivative material.

15. The method of claim 14, wherein the derivation type is an alternate version.

16. The method of claim 14, wherein the derivation type is a commentary.

17. The method of claim 10, further comprising providing Web pages in the form of a plurality of passages and allowing a contributor to enter passage characteristics associated with each passage.

18. The method of claim 10, further comprising automatically generating a derivation link from each previously contributed material to each of the derivations based on that previously contributed material, wherein the user navigates from the previously contributed material on which a given derivation is based to the given derivation using one of the derivation links.

19. A computer-readable storage medium containing computer executable instructions for allowing a sponsor to set up an interactive web book, allowing a contributor to contribute material to the interactive web book, allowing the contributor to create a derivation of material in the interactive web book, and compensating both the sponsor and the contributor.

20. The computer-readable storage medium of claim 19, further comprising computer executable instructions for automatically rewarding the contributor based on the amount that their material is accessed by users and the attribution information.

21. The computer-readable storage medium of claim 20, wherein automatically rewarding the contributor further comprises automatically making monetary distributions to the contributors.

22. A computer-readable storage medium containing computer executable instructions for managing interactive web books, comprising computer executable instructions for supporting a first interactive web book, allowing a sponsor to replicate the first interactive web book to create a second interactive web book, allowing a contributor to create a derivation of material in the interactive web book, and compensating the contributor of the first interactive web book based on revenue derived from the second interactive web book and/or the derivation.

23. The computer-readable storage medium of claim 22, wherein the creating a derivation comprises allowing a contributor of derivative material based on previously contributed material to enter a derivation type to be associated with the derivative material.

24. The computer-readable storage medium of claim 23, wherein the derivation type is an alternate version.

25. The computer-readable storage medium of claim 23, wherein the derivation type is a commentary.

26. The computer-readable storage medium of claim 22, further comprising providing Web pages in the form of a plurality of passages and allowing a contributor to enter passage characteristics associated with each passage.

27. The computer-readable storage medium of claim 22, further comprising automatically generating a derivation link from each previously contributed material to each derivation based on that previously contributed material, wherein the user navigates from the previously contributed material on which a given derivation is based to the given derivation using one of the derivation links.

28. A system for managing interactive web books, comprising:
   means for allowing a sponsor to set up an interactive web book;
   means for allowing a contributor to contribute material to the interactive web book;
   means for allowing the contributor to create a derivation of material in the interactive web book; and
   means for compensating both the sponsor and the contributor.

29. The system of claim 28, further comprising means for generating attribution information identifying the contributor whose material is used to create the derivation.

30. The system of claim 29, further comprising means for automatically rewarding the contributor based on the amount that their material is accessed by users and the attribution information.

31. The system of claim 30, wherein the means for automatically rewarding the contributor further comprises a means for automatically making monetary distributions to the contributor.

32. A system for managing interactive web books, comprising means for supporting a first interactive web book, means for allowing a sponsor to replicate the first interactive web book to create a second interactive web book, means for allowing a contributor to create a derivation of material in the interactive web book, and means for compensating the contributor of the first interactive web book based on revenue derived from the second interactive web book and/or the derivation.

33. The system of claim 32, wherein the means for creating a derivation comprises means for allowing a contributor of derivative material based on previously contributed material to enter a derivation type to be associated with the derivative material.

34. The system of claim 33, wherein the derivation type is an alternate version.

35. The system of claim 33, wherein the derivation type is a commentary.

36. The system of claim 32, further comprising means for providing Web pages in the form of a plurality of passages and allowing a contributor to enter passage characteristics associated with each passage.

37. A system comprising a server, at least one client linked by a data network, and software configured to allow a sponsor to set up an interactive web book, allow a contributor to contribute material to the interactive web book, allow the contributor to create a derivation of material in the interactive web book, and compensate both the sponsor and the contributor.

38. A system, comprising a server, at least one client linked by a data network, and software configured to support a first interactive web book, allow a sponsor to replicate the first interactive web book to create a second interactive web book, allow a contributor to create a derivation of material in the interactive web book, and compensate the contributor of the first interactive web book based on revenue derived from the second interactive web book and/or the derivation.

* * * * *

UNITED STATES PATENT AND TRADEMARK OFFICE
CERTIFICATE OF CORRECTION

PATENT NO. : 7,447,748 B2
APPLICATION NO. : 10/783711
DATED : November 4, 2008
INVENTOR(S) : Brian Reynolds et al.

It is certified that error appears in the above-identified patent and that said Letters Patent is hereby corrected as shown below:

Title page 2, in field (56), under "Other Publications", in column 2, line 18-19, below "(1995)." delete ""Interactive….(1991).".

In Sheet 5 of 14, FIG. 5, Ref. Num. 116, line 1, delete "OBLIGATONS" and insert -- OBLIGATIONS --, therefor.

In Sheet 5 of 14, FIG. 5, Ref. Num. 124, line 1, delete "OFEER" and insert -- OFFER --, therefor.

In column 1, line 2, below "SYSTEM" insert -- CROSS REFERENCE TO RELATED APPLICATIONS --.

In column 16, line 42, in Claim 14, delete "13" and insert -- 10 --, therefor.

Signed and Sealed this

Third Day of February, 2009

JOHN DOLL
*Acting Director of the United States Patent and Trademark Office*